(12) United States Patent
McEvoy et al.

(10) Patent No.: US 6,688,686 B1
(45) Date of Patent: Feb. 10, 2004

(54) ENERGY ABSORBENT LUMBAR SUPPORT

(75) Inventors: James Thomas McEvoy, Howell, MI (US); Chi-Fan Hsu, Novi, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/561,683

(22) Filed: May 1, 2000

(51) Int. Cl.$^7$ ................................................. A47C 3/025
(52) U.S. Cl. ................ 297/284.4; 264/46.4; 297/DIG. 1
(58) Field of Search .......................... 297/452.29, 452.3, 297/452.31, 452.32, 452.37, DIG. 1, 230.13, 219.1, 112, 284, 4, DIG. 2, 452.28; 264/45.1, 46.4; 29/428

(56) References Cited

U.S. PATENT DOCUMENTS

| | | | | |
|---|---|---|---|---|
| 2,769,485 A | * | 11/1956 | Shapiro | |
| 2,833,340 A | * | 5/1958 | Shapiro | |
| 3,099,483 A | * | 7/1963 | Hofberg | |
| 3,137,524 A | * | 6/1964 | Chancellor, Jr. | |
| 3,642,323 A | * | 2/1972 | Taylor | |
| 4,471,993 A | * | 9/1984 | Watson | |
| 4,572,578 A | * | 2/1986 | Perkins | |
| 4,597,386 A | * | 7/1986 | Goldstein | |
| 4,793,574 A | * | 12/1988 | Fenske et al. | |
| 4,865,379 A | * | 9/1989 | Aoki et al. | |
| 4,950,032 A | * | 8/1990 | Nagasaka | |
| 5,039,158 A | * | 8/1991 | Maier | |
| 5,290,089 A | | 3/1994 | Oleszko et al. | |
| 5,310,030 A | | 5/1994 | Kawakita et al. | |
| 5,544,942 A | * | 8/1996 | Vu Khac et al. | |
| 5,758,924 A | * | 6/1998 | Vishey | |
| 5,836,647 A | | 11/1998 | Turman | |
| 5,863,095 A | * | 1/1999 | Rivard et al. | |
| 5,911,477 A | | 6/1999 | Mundell et al. | |
| 5,947,558 A | | 9/1999 | Suzuki et al. | |
| 5,967,608 A | | 10/1999 | Van Sickle | |
| 6,082,815 A | * | 7/2000 | Xiromeritis et al. | |

\* cited by examiner

*Primary Examiner*—Milton Nelson, Jr.
(74) *Attorney, Agent, or Firm*—Foley & Lardner (57) ABSTRACT

An energy absorbing lumbar seat insert for a vehicle seat is provided. The seat insert provides support for the user's lumbar area. The insert is preferably composed of high-density, energy absorbing polymerized material such as a polyurethane. Alternatively, the insert may be composed from other polymerized materials, including polyethylene, polypropylene, and polystyrene, or any combination thereof. The insert may be made of a single polymer or a mixture, or may be composed of multiple layers of two or more different polymers. Attachment of the insert to the seat back may be accomplished by chemical or mechanical fastening. The insert may be molded to conform to the profile of the lumbar region of the back of a particular driver.

26 Claims, 6 Drawing Sheets

ENERGY ABSORBENT LUMBAR SUPPORT

TECHNICAL FIELD OF THE INVENTION

This invention generally relates to lumbar support systems for automotive vehicles. More particularly, the present invention relates to lumbar support device in the form of an energy-absorbent, high density foam insert for attachment to a vehicle seat in the approximate region of the lumbar curvature of the human spine.

BACKGROUND

Materials for vehicle interiors, particularly vehicle seats, have had a long history of development. Vehicle seats were formed from leather over padding. Eventually the padding was supported by an array of coil springs attached at one end to a wooden supporting frame. The padding for early vehicle seats was selected from a natural material such as horse hair and cotton. Eventually, synthetic materials replaced the natural materials due largely to cost and comfort considerations. The synthetic material of choice was a polyurethane foam, and most seat bodies have been made ever since from such material.

Today, in the design and manufacture of seats for vehicles, particularly automotive vehicles, both safety and comfort are areas of greater concern. In the area of safety, it is increasingly desired to eliminate seat rebound in the event of a rear-end collision. The goal in such design is to have the seat absorb impact energy so that the seat does not re-deliver the energy (much like a spring) to the occupant during a re-bound phase.

Some efforts have been made with varying degrees of success to respond to this need. For example, attention may be directed to U.S. Pat. No. 5,290,089, issued to Oleszko et al. on Mar. 1, 1994, for SEAT BELLOWS ENERGY ABSORBER which discloses a recliner arrangement for a vehicle seat that includes an energy absorber positioned between a linear recliner element and a seat backrest unit. The energy absorber is operative upon a force exerted thereon. Attention may also be directed to U.S. Pat. No. 5,310,030, issued to Kawakita et al. on May 10, 1994, for ENERGY-ABSORBING FASTENED STRUCTURE which discloses an energy-absorbing fastened structure for use with a vehicle seat. The structure includes first and second platelike members fastened by a fastener. Finally, attention may be directed to U.S. Pat. No. 5,836,647, issued to Turman on Nov. 17, 1998, for VEHICLE SEAT WITH SHOCK ABSORPTION which includes a rear impact energy absorbing damping system. Each of these disclosures relates to a method of absorbing energy from a vehicle impact.

In addition to seeking an improvement in the design of the automotive vehicle seat to improve safety, automobile designers are also continuously interested in improving seat comfort. Much energy has been devoted to the improvement of a vehicle seat which provides improved support and comfort for the driver's back. Particularly, attention has been devoted to providing support for the driver's lumbar vertebrae which include the lowermost five vertebra of the human vertebral column. The lumbar vertebrae are frequently subjected to a high degree of downward pressure, a condition which frequently leads to the non-life threatening (but endlessly annoying) condition known commonly as "lower back pain."

Many efforts have been undertaken to deal with this condition. For example, some vehicle seats have been fitted with an inflatable air bladder situated roughly behind the lumbar region of the driver's back. By toggling a control switch, the driver can control the amount of air pumped into (or released from) the air bladder. An example of such a device may be found in U.S. Pat. No. 5,967,608, issued to Van Sicle on Oct. 19, 1999, for PNEUMATIC LUMBAR ADJUSTMENT SYSTEM.

Other attempts have been known at providing lumbar support for vehicle seats. For example, U.S. Pat. No. 5,911,477, issued on Jun. 15, 1999, to Mundell et al. for LUMBAR SUPPORT STRUCTURE FOR AUTOMOTIVE VEHICLE discloses a lumbar support mechanism for incorporation into a seat. The mechanism comprises a pair of opposing triangular brackets, each having a base and a peak, wherein the brackets are positioned such that the peaks are facing one another. The brackets are movable with respect to each other. An additional example of a lumbar support device may be found in U.S. Pat. No. 5,947,558, issued to Suzuki et al. on Sep. 7, 1999, for LUMBAR SUPPORT DEVICE. The device of this patent includes a first drive device fixed to a stationary bracket member to move a lumbar pad upward and downward of a seat back, and a second drive device secured on a movable member which is one member of a link mechanism.

While arguable providing improvements in the areas of safety and comfort, no satisfactory approach to resolving both of these concerns has been advanced, thus a resolution to the need for providing safety and comfort for the lower back of the driver seated in a vehicle remains wanting.

SUMMARY OF THE INVENTION

It is an object of the present invention to provide a seat for a vehicle, particularly an automotive vehicle, which overcomes the above problems.

More particularly, it is an object of the present invention to provide an insert for attachment to a vehicle seat to provide passive support to the lumbar region of the human spine.

It is a further object of the present invention to provide such a seat insert which, when combined with a vehicle seat, offers improved comfort over known vehicle seats.

A further object of the present invention is to provide such a seat insert which is composed of a high-density, semi-rigid material.

Still a further object of the present invention is to provide such a seat insert which is composed of a polyurethane.

Yet an additional object of the present invention is to provide such a seat insert which is composed of one or more materials selected from the group consisting of polyethylene, polypropylene, and polystyrene.

An additional object of the present invention is to provide such a seat insert which is composed of two or more layers of different polymerized materials.

Still a further object of the present invention is to provide such seat insert which is formed in accordance with a mold of a driver's back.

Yet still an additional object of the present invention is to provide such a seat insert which is attached to the seat back by chemical or mechanical attachment.

These and other advantages are achieved by the provision of an energy absorbing seat insert for a vehicle seat. The seat insert provides support for the user's lumbar area. The insert is preferably composed of high-density, energy absorbing polymerized material such as a polyurethane. Alternatively, the insert may be composed from other polymerized materials, including polyethylene, polypropylene, and polystyrene, or any combination thereof. The insert may be made of a single polymer or a mixture, or may be composed of multiple layers of two or more different polymers. Attachment of the insert to the seat back may be accomplished by chemical or mechanical fastening. The insert may be molded to conform to the profile of the lumbar region of the back of a particular driver.

BRIEF DESCRIPTION OF THE DRAWINGS

The present invention will be more fully understood by reference to the following detailed description of the preferred embodiments of the present invention when read in conjunction with the accompanying drawings in which like reference characters refer to like parts throughout the views, and in which.

DETAILED DESCRIPTION OF THE PREFERRED EMBODIMENTS

The drawings disclose the preferred embodiments of the present invention. While the configurations according to the illustrated embodiments are preferred, it is envisioned that alternate configurations of the present invention may be adopted without deviating from the invention are portrayed. The preferred embodiments are discussed hereafter.

Figure 1:
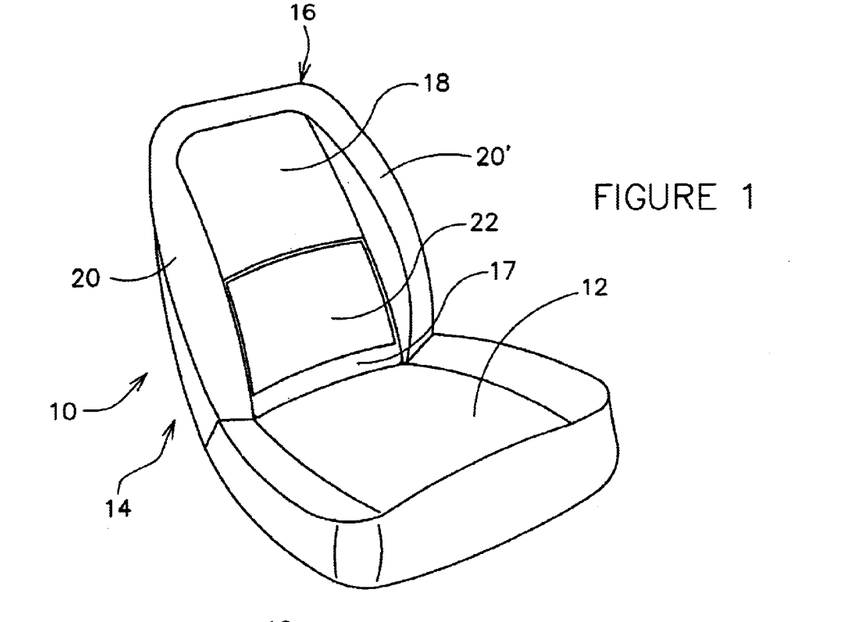
FIG. 1 is a perspective view of a vehicle seat assembly having the seat insert and the back seat of the present invention.

The vehicle seat assembly having the lumbar-supporting seat insert of the present invention is shown in perspective in FIG. 1 and is designated generally as 10. Seat assembly 10 includes a lower, generally horizontal seat part 12 and a backrest 14 extending generally upwardly at the rear of the lower seat part 12. The backrest 14 has an upper end 16 and a lower end 17. The upper end 16 includes an outer surface 18 and the lower end 17 includes an outer surface 19. Adjacent the sides of the upper end 16 and the lower end 17 are a pair of spaced apart side members 20, 20'. The upper end 16, the lower end 17, and the pair of spaced apart side members 20, 20' may be made from a variety of materials such as molded polyurethane foam which is the material of choice for today's vehicle seats.

As is known, polyurethane is generally thermoplastic and is composed of a variety of synthetic rubber polymers produced by the polymerization of hydroxyl radical and NCO group from two different compounds. Polyurethanes are desirable for their high durometer readings, good elongation, high tensile strength, and good resistance to ozone and oxygen. According to the manufacturing techniques applied by industry today, the base components are mixed and are thereafter injected into a closed mold that is typically heated. A variety of polymerized materials may be used for the formation of the upper end 16, the lower end 17, and the pair of spaced apart side members 20, 20'.

A metal frame (not shown) would ordinarily be used to provide structural support to the upper end 16, the lower end 17, and the pair of spaced apart side members 20, 20' of the backrest 14.

Intermediate of the upper end 16 and the lower seat end 17 is a lumbar support seat insert 22. While the upper end 16, the lower end 17, and the pair of spaced apart side members 20, 20' of the backrest 14 may be molded as a unit, the seat insert 22 is formed separately.

Figure 2:
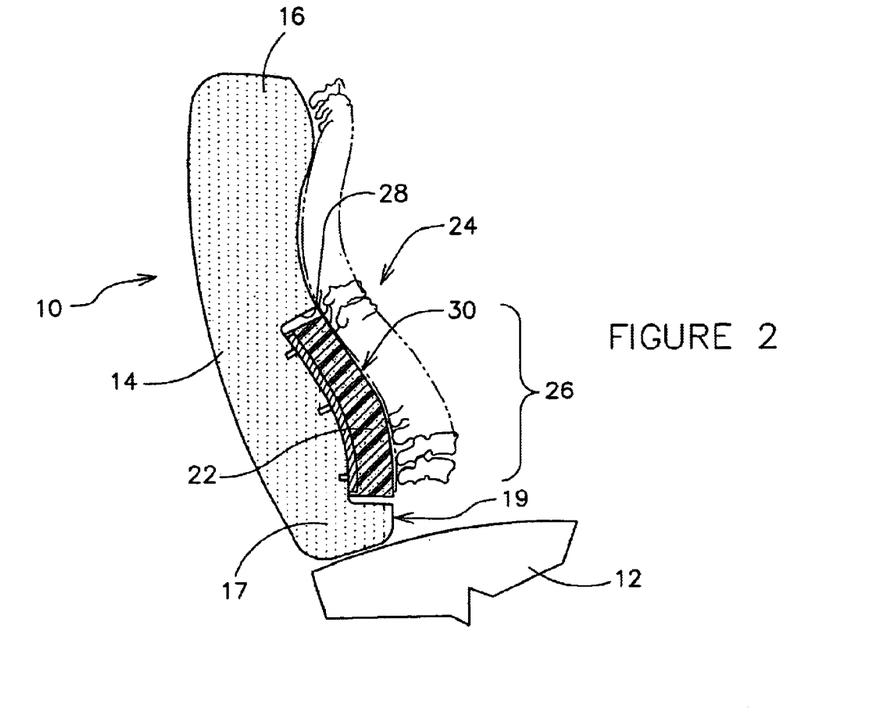
FIG. 2 is a sectional view of the vehicle seat assembly and seat insert of the present invention showing a characterized spinal column in place relative to the seat back.

Referring to FIG. 2, a sectional view of the vehicle seat assembly 10 and the lumbar supporting seat insert 22 is illustrated. A characterized human vertical column, generally illustrated as 24, is shown in its approximate position adjacent the front side of the backrest 14. The vertical column 24 includes a lumbar curve 26 which incorporates five lumbar vertebra. FIG. 2 illustrates how the seat insert 22 provides complete support for the vertebra of the lumbar curve 26.

Figure 3:
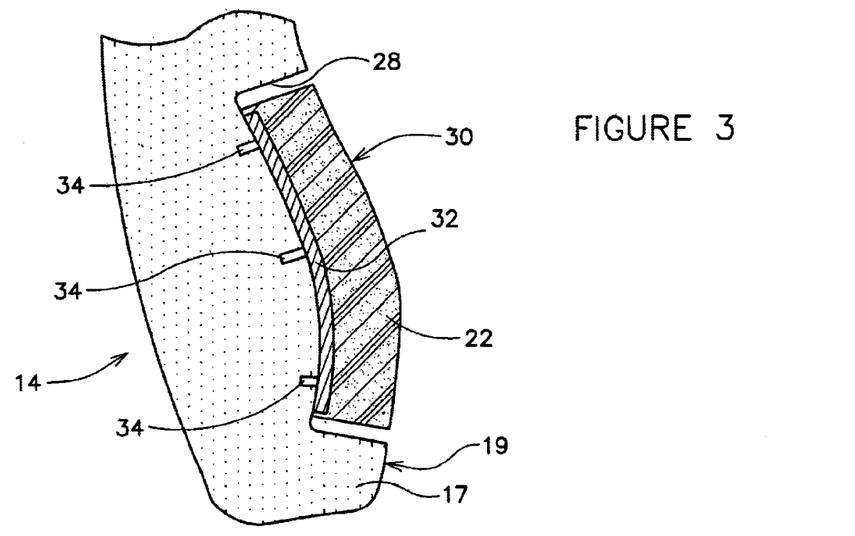
FIG. 3 is a close-up sectional view of the seat insert of the present invention in place relative to the receiving area of the seat back.
Figure 5:
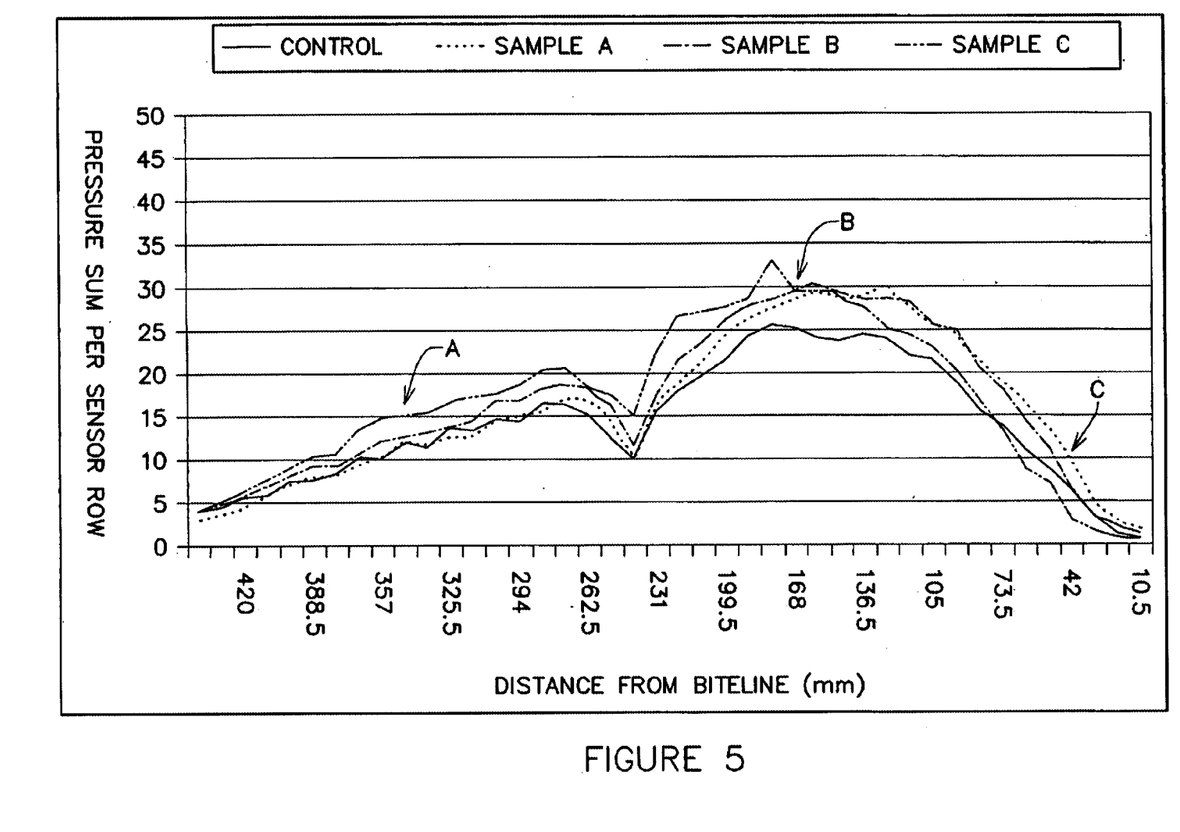
FIG. 5 is a graph illustrating a comparative study of overall cushion support with respect to the thigh support region, ischial support region, and cushion tailburn region of the driver with pressure sum per sensor row on the Y-axis and distance from the biteline along the X-axis.

The seat insert 22 is disposed within a recessed area 28 defined in the backrest 14. The recessed area 28 may be of a variety of shapes and orientations other than that illustrated herein. The seat insert 22 includes an outer surface 30 which is more or less flush with the outer surface 18 of the upper end 16 and the outer surface 19 of the lower end 17. (It should be noted that FIGS. 2, 3, and 5 illustrate a gap above and below the seat insert 22. This may or not be present in the backrest 14. Specifically, and by way of providing a manufacturing example, if the seat insert 22 is molded in place, there would likely be no gap.)

The seat insert 22 may be composed of a variety of polymerized materials. While a polyurethane is the material of choice, the only preferred minimum requirements of the selected material are that it be an energy absorbent, high density foam and that the resulting product be semi-rigid. As such, the seat insert 22 may be composed of a variety of energy absorbing materials, including, in addition to polyurethane, polypropylene, polystyrene, and polyethylene foam. These materials may be used exclusively or a combination of one or more of these materials may be employed.

The seat insert 22 may be produced by a variety of production methods, including a "one shot" process in which the ingredients used for forming the foam are mixed and injected into a closed, optionally-heated mold. An alternative method of producing the seat insert 22 is set forth below in relation to FIG. 4.

Regardless of how the seat insert 22 is formed, a strongly preferred optional embodiment includes the step of having the outer surface 30 of the seat insert 22 contoured to match the lumbar area of a particular driver. The process of creating such a contoured surface would be to create a mold of the driver's lumbar area then use the created mold as the mold surface for the outer side 30 of the seat insert 22. In this fashion, the seat assembly 10 (once assembled) would be "personalized" to the driver.

Referring to FIG. 3, a close-up sectional view of the seat insert 22 of the present invention in place relative to the recessed area 28 of the backrest 14 is illustrated. As shown, the seat insert 22 optionally includes an inner support member 32 which provides structural support to the seat insert 22. The support member 32, if present, may be composed of a variety of materials, including a variety of fiber-reinforced polymerized materials.

The seat insert 22 is attached to the backrest 14 by a variety of methods, including chemical and mechanical fastening. For example, a chemical adhesive such as liquid or hot glue or a pressure-sensitive material (not shown) may be used to mate the seat insert 22 to the back wall of the recessed area 28. Alternatively, mechanical fasteners, such as fasteners 34, may be used as illustrated in FIG. 3. The mechanical fasteners 34 may be screws, rods, or hook-and-loop fasteners.

In one method of production, the seat insert 22 is formed separately then is molded in-situ with the backrest 14 according to the known method of placing the already-molded seat insert 22 in a mold cavity (not shown) then injecting a selected polymerizable material into the cavity.

Figure 4:
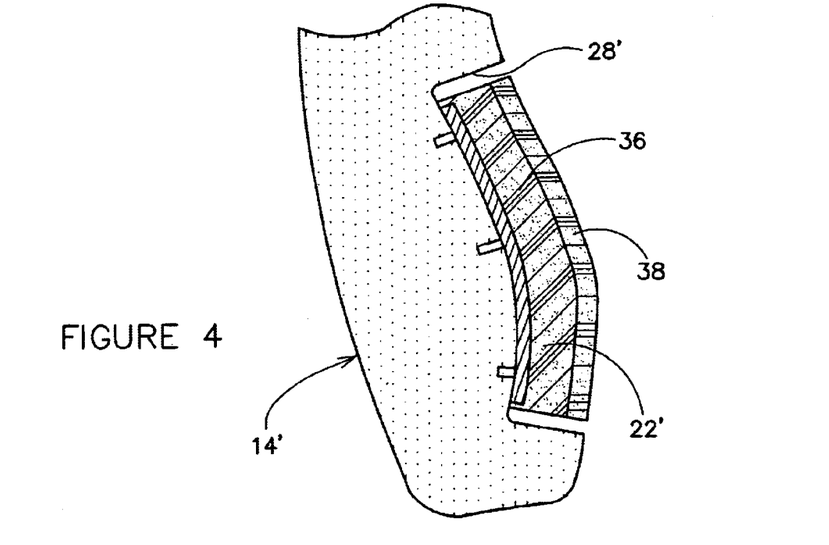
FIG. 4 is a close-up sectional view of an alternate embodiment of the seat insert of the present invention in place relative to the receiving area of the seat back.

Referring to FIG. 4, a close-up sectional view of an alternate embodiment of a seat insert, generally illustrated as 22' of the present invention in place in a recessed area 28' of a backrest 14' is illustrated. According to the illustrated embodiment, the seat insert 22' is formed from two separate layers of polymerized materials, there being (for exemplary purposes) an inner layer 36 and an outer layer 38. The layers 36, 38 may be composed of like materials or differ materials. In any event, the layers 36, 38 may be composed of one or more polymerized materials selected from the group consisting of polyurethane, polypropylene, polystyrene, and polyethylene.

Having generally described the invention, a further understanding can be obtained by reference to certain specific examples which are provided herein for purposes of illustration only and are not intended to be limiting unless otherwise specified.

EXAMPLES

A number of lumbar supporting seat inserts according to the present invention were prepared and tested. Each of the prepared inserts was prepared from polyurethane with polyols and an MDI without mixing or layering with any other polymer. The results of the comparative analyses are set forth in FIGS. 5 through 8.

In general, pressure distribution sensors were fitted to the back sides of a control part and on different sample parts. The sensors were fitted to measure pressure distribution on the control and the samples. The various samples tested represent different densities and different hardnesses. These tests identify what happened when the lumbar support is included in a given test seat assembly and how a given individual responded to pressure exerted on the lumbar support. In essence, FIGS. 5 through 8 may be interpreted as a map of pressure applied to the seat surface using the control and samples A, B, and C representing the degree to which the test occupants are literally sinking into the test seats.

For each of FIGS. 5, 6, 7, and 8, Samples A, B, and C differ from the Control in terms of foam type and hardness. Specifically, the Control is not an energy absorbing foam. Accordingly, the hardness of Sample A is the same as the Control, but Sample A is an energy absorbing foam, while the control is not. Generally, Sample B is 10% softer than the Control while Sample C is 25% softer than the Control.

With respect to FIG. 5, this is a graph illustrating a comparative study of overall cushion support with respect to the thigh support region (designated as region A), the ischial support region (designated as region B), and the cushion tailburn region (designated as region C) of the driver with pressure sum per sensor row on the Y-axis and distance from the biteline along the X-axis.

Figure 6:
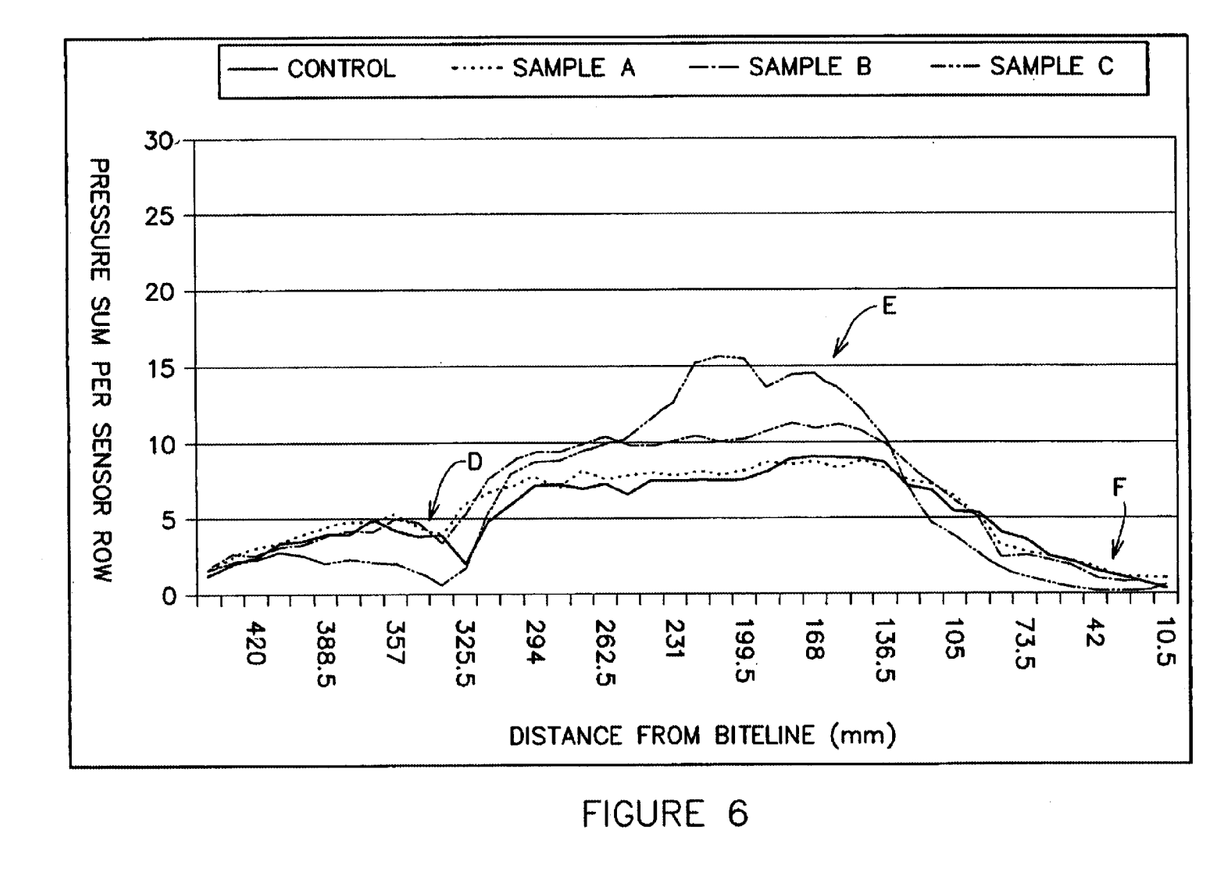
FIG. 6 is a graph illustrating a comparative study of overall cushion support with respect to the shoulder support region, the lumbar support region, and the back tailburn region of the driver with pressure sum per sensor row on the Y-axis and distance from the biteline along the X-axis.

With respect to FIG. 6, this is a graph illustrating a comparative study of overall cushion support with respect to the shoulder support region (designated as region D), the lumbar support region (designated as region E), and the back tailburn region (designated as region F) of the driver with pressure sum per sensor row on the Y-axis and distance from the biteline along the X-axis.

FIGS. 5 and 6 demonstrate that the greatest change in support is in the area of the lumbar support region which is most clearly shown by Samples B and C, with Sample C representing the most dramatic improvement in support. Importantly, this improvement in support is accomplished without the aid of mechanical means.

Figure 7:
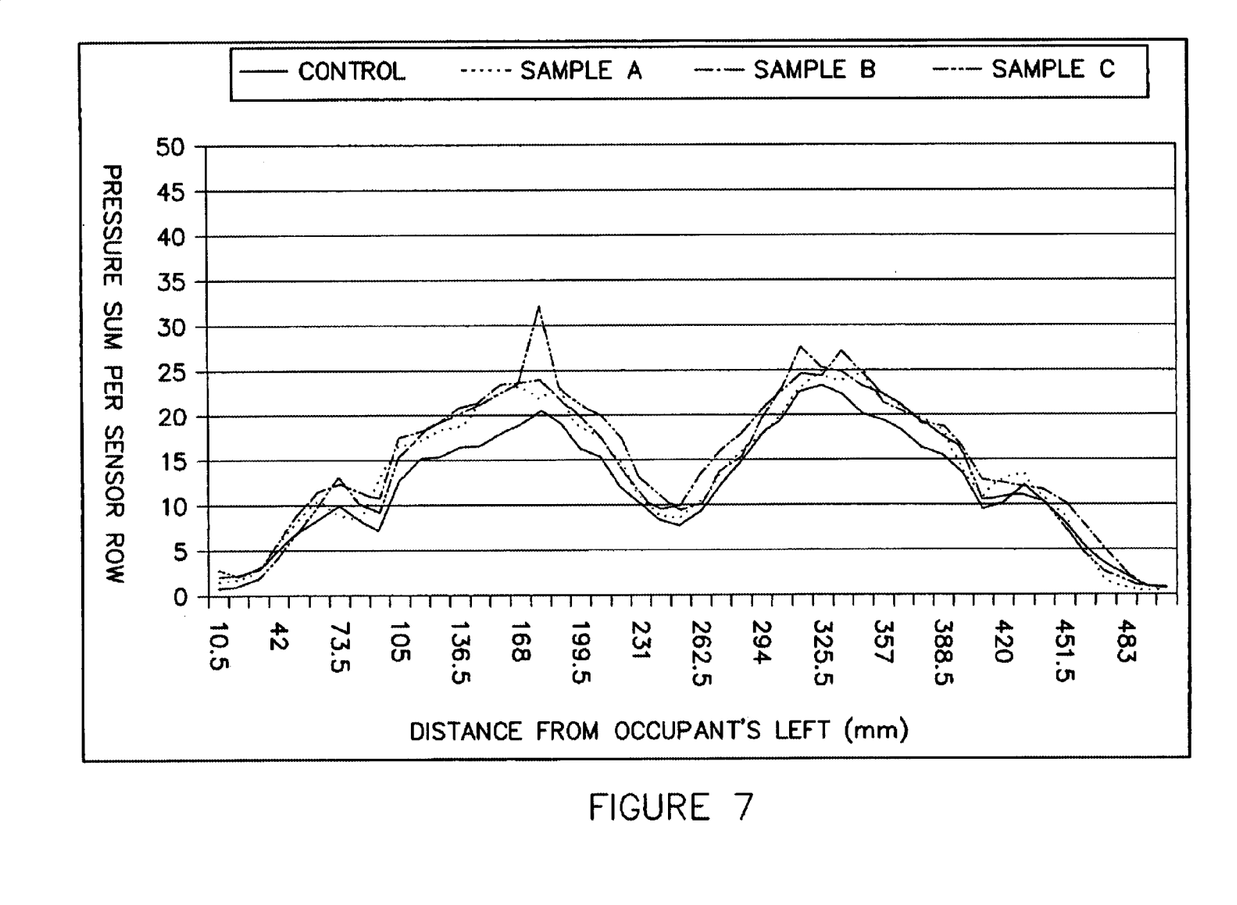
FIG. 7 is a graph illustrating a comparative study of overall cushion lateral symmetry with pressure sum per sensor row on the Y-axis and distance from the occupant's left arm along the X-axis.
Figure 8:
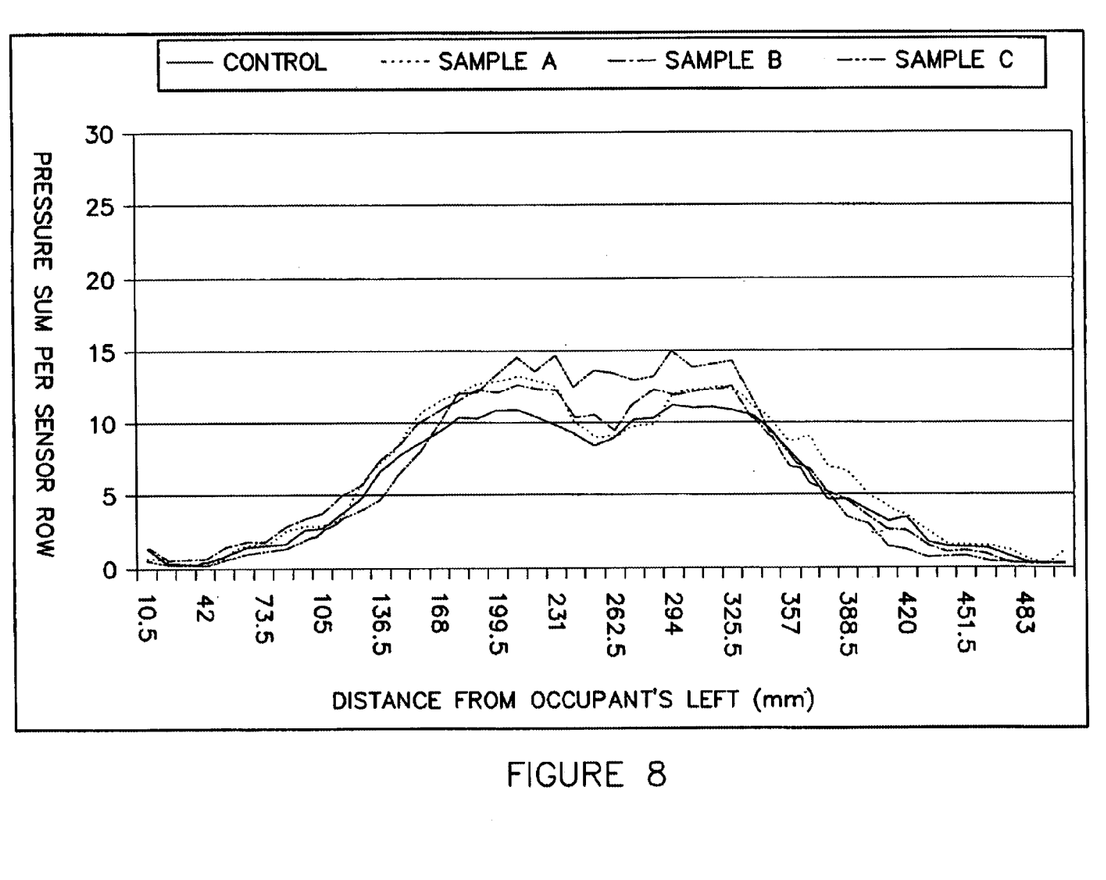
FIG. 8 is a graph illustrating a comparative study of overall back lateral symmetry with pressure sum per sensor row on the Y-axis and distance from the occupant's left arm along the X-axis.

With respect to FIG. 7, a graph illustrating a comparative study of overall cushion lateral symmetry with pressure sum per sensor row on the Y-axis and distance from the occupant's left arm along the X-axis is shown. Similarly, FIG. 8 is a graph illustrating a comparative study of overall back lateral symmetry with pressure sum per sensor row on the Y-axis and distance from the occupant's left arm along the X-axis. These test results demonstrate that pressure values are almost consistent between the Control and Samples A, B, and C and do not represent any dramatic departures from the "norm" in spite of providing significantly improved values for lateral support itself as shown in FIG. 6.

Analysis

The test results were then compared with ASTM standards for mannequin weights. The following Tables A and B demonstrate the differences between pressures on sample lumbar inserts. The "5th %" refers to that percentile of persons having a height of about 160 cm and a weight of about 49 kg. The "50th %" refers to that percentile of persons having a height of about 177 cm and a weight of about 78 kg. The "95th %" refers to that percentile of persons having a height of about 191 cm and a weight of about 99 kg.

The recommended lumbar pressure peak is in the range of between 1.489 psi and 2.587 psi.

Table A illustrates a chair assembly as tested without the lumbar supporting seat insert of the present invention. In particular, the pressure peaks for the 5th percentile and the 50th percentile fall outside of the ideal range. The 95th percentile—the heavier person who most frequently complains about inadequate lumbar support in a vehicle seat—is barely within the recommended range.

TABLE A

| Factors | Recommended | 5th % | 50th % | 95th % | Overall |
|---|---|---|---|---|---|
| Cushion | mm | mm | mm | mm | mm |
| cushion width 200 mm from H-pt | 330–512 | | | | |
| Back | mm | mm | mm | mm | mm |
| back width 400 mm from H-pt | 455–522 | | | | |
| Pressure Load | % | % | % | % | % |
| back tailburn | 0.0–3.4 | 1.5% | 0.3% | 0.5% | 0.8% |
| lumbar support | 11.0–16.2 | 15.0% | 16.6% | 17.2% | 16.3% |
| shoulder support | 7.0–8.7 | 12.2% | 12.3% | 10.0% | 11.5% |
| cushion tailburn | 0.0–13.8 | 4.4% | 2.1% | 4.9% | 3.8% |
| ischial support | 40.0–45.9 | 45.8% | 42.8% | 44.6% | 44.4% |
| thigh support | 18.2–25.6 | 21.1% | 25.8% | 22.9% | 23.3% |
| Pressure Peak | psi | psi | psi | psi | psi |
| back tailburn | 0.0–1.683 | 0.5 | 0.3 | 0.5 | 0.5 |
| lumbar | 1.489–2.587 | 1.0 | 1.1 | 1.7 | 1.7 |
| shoulder | .927–1.567 | 0.9 | 0.8 | 0.9 | 0.9 |
| cushion tailburn | 0.0–2.010 | 1.3 | 1.0 | 1.9 | 1.9 |
| ischial | 1.155–2.775 | 3.5 | 2.4 | 4.6 | 4.6 |
| thigh | .638–2.363 | 1.2 | 1.3 | 1.6 | 1.6 |
| Predicted Scores | | | | | |
| JD Powers | | −6.29 | −6.94 | −6.22 | −6.22 |
| JD Powers lumbar TGW | | 8.45 | 8.45 | 8.45 | 8.45 |
| JCI overall comfort score | | 3.72 | 3.72 | 3.71 | 3.72 |
| Pressure rating | | 7.50 | 5.00 | 6.25 | 7.50 |

Table B illustrates a chair assembly as tested with the lumbar supporting seat insert of the present invention. These test results demonstrate that the improvement works best for the heavier person (in the 95th percentile) who falls almost half way between the extremes of the ideal range of 1.489 psi and 2.587 psi. The medium person (in the 50th percentile) is also comfortably within this range. Only the 5th percentile person falls outside of the range. This group, however, normally does not suffer from inadequate lumbar support in vehicles.

TABLE B

| Factors | Recommended | 5th % | 50th % | 95th % | Overall |
|---|---|---|---|---|---|
| Cushion | mm | mm | mm | mm | mm |
| cushion width 200 mm from H-pt | 330–512 | | | | |
| Back | mm | mm | mm | mm | mm |
| back width 400 mm from H-pt | 455–522 | | | | |
| Pressure Load | % | % | % | % | % |
| back tailburn | 0.0–3.4 | 1.9% | 0.2% | 0.5% | 0.9% |
| lumbar support | 11.0–16.2 | 15.6% | 15.6% | 16.1% | 15.8% |
| shoulder support | 7.0–8.7 | 11.3% | 11.9% | 10.3% | 11.2% |
| cushion tailburn | 0.0–13.8 | 5.5% | 2.1% | 5.3% | 4.3% |
| ischial support | 40.0–45.9 | 46.0% | 44.9% | 45.4% | 45.4% |
| thigh support | 18.2–25.6 | 19.6% | 25.3% | 22.5% | 22.5% |
| Pressure Peak | psi | psi | psi | psi | psi |
| back tailburn | 0.0–1.683 | 0.6 | 0.5 | 1.3 | 1.3 |
| lumbar | 1.489–2.587 | 4.4 | 1.9 | 2.1 | 4.4 |
| shoulder | .927–1.567 | 1.0 | 1.3 | 1.0 | 1.3 |
| cushion tailburn | 0.0–2.010 | 1.5 | 2.1 | 1.6 | 2.1 |
| ischial | 1.155–2.775 | 2.5 | 3.8 | 2.2 | 3.8 |
| thigh | .638–2.363 | 1.5 | 1.4 | 1.5 | 1.5 |
| Predicted Scores | | | | | |
| JD Powers | | −5.77 | −6.32 | −3.42 | −3.42 |
| JD Powers lumbar TGW | | 8.45 | 8.45 | 8.45 | 8.45 |
| JCI overall comfort score | | 3.71 | 3.72 | 3.71 | 3.71 |
| Pressure rating | | 6.25 | 8.75 | 8.75 | 7.50 |

As can be understood by reference to the tables, the person that has very little weight, the person of the 5th percentile category, the lumbar support makes little change as this person would not ordinarily sink into the insert. However, the heavier the driver is, the more the ability to make the pressure change so that the person is not receiving such a high degree of lumbar pressure in the lumbar area. Accordingly, the heavier test occupant resting against the insert of the present invention would not receive as much pressure in the lumbar as compared with that of the "normal" person.

Accordingly, as may be understood by reference to the tables, it is evident that the present invention provides an improvement in the pressure peaks. The heavier person ordinarily complains about the lumbar support having too much pressure, and the present invention alleviates that problem by providing a lumbar support system which is essentially "self-adjusting", particularly for the heavier seat occupant.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A vehicle seat having a seat back for providing support to a lumbar region of a driver, comprising:
   a seat insert adapted for installation in a recessed area in the seat back, the seat insert having a first layer and a second layer formed from a polymerized material;
   wherein the seat insert is a self-adjusting material that exerts a decreasing amount of pressure on the lumbar region of the driver as the weight of the driver increases.

2. The vehicle seat of claim 1 wherein at least one of the first layer and the second layer are formed from a mold of the lumbar region of the driver.

3. The vehicle seat of claim 1 further comprising a support structure provided substantially within the seat insert.

4. The vehicle seat of claim 1 wherein the polymerized material is a high density foam.

5. The vehicle seat of claim 1 wherein the first layer and the second layer comprise a material selected from the group consisting of polyurethane, polypropylene, polystyrene, and polyethylene.

6. The vehicle seat of claim 1 wherein the seat insert is attached to the seat back by a chemical adhesive.

7. A method of manufacturing a vehicle seat which provides support to a lumbar region of a driver's back, the method comprising the steps of:

forming a lumbar-supporting seat insert from an energy absorbent polymerized material;

forming a first layer of a first polymerized material and forming a second layer of a second polymerized material;

forming a seat back having a front side and a recessed area defined on the front side of the seat back for placement of the seat insert;

attaching the seat insert to the recessed area defined on the front side of the seat back for placement of the seat insert.

8. The method of claim 7 wherein the energy absorbent polymerized material is a high density foam.

9. The method of claim 7 wherein the energy absorbent polymerized material is selected from the group consisting of polyurethane, polypropylene, polystyrene, and polyethylene.

10. The method of claim 7 wherein the energy absorbing polymerized material is a mixture of one or more polymerized materials.

11. The method of claim 7 wherein the first polymerized material and the second polymerized material are selected from the group consisting of polyurethane, polypropylene, polystyrene, and polyethylene.

12. The method of claim 7 wherein at least one of the first layer and the second layer are formed from a mold of the driver's back.

13. A method of manufacturing a vehicle seat which provides support to a lumbar region of a driver's back, the method comprising the steps of:

forming a lumbar-supporting seat insert from an energy absorbent polymerized material;

forming a mold of the driver's lumbar area and forming a front side on the seat insert from the mold;

forming a seat back having a front side and a recessed area defined on the front side of the seat back for placement of the seat insert;

attaching the seat insert to the recessed area defined on the front side of the seat back for placement of the seat insert.

14. The method of claim 13 wherein the energy absorbent polymerized material is a high density foam.

15. The method of claim 13 wherein the energy absorbent polymerized material is selected from the group consisting of polyurethane, polypropylene, polystyrene, and polyethylene.

16. The method of claim 13 wherein the energy absorbing polymerized material is a mixture of one or more polymerized materials.

17. The method of claim 13 wherein the energy absorbent polymerized material comprises a first polymerized material and a second polymerized material that are selected from the group consisting of polyurethane, polypropylene, polystyrene, and polyethylene.

18. A method of manufacturing a vehicle seat which provides support to a lumbar region of a driver's back, the method comprising the steps of:

forming a lumbar-supporting seat insert from an energy absorbent polymerized material;

forming a support structure substantially within the seat insert;

forming a seat back having a front side and a recessed area defined on the front side of the seat back for placement of the seat insert;

attaching the seat insert to the recessed area defined on the front side of the seat back for placement of the seat insert.

19. The method of claim 18 wherein the energy absorbent polymerized material is a high density foam.

20. The method of claim 18 wherein the energy absorbent polymerized material is selected from the group consisting of polyurethane, polypropylene, polystyrene, and polyethylene.

21. The method of claim 18 wherein the energy absorbing polymerized material is a mixture of one or more polymerized materials.

22. The method of claim 18 wherein the energy absorbent polymerized material comprises a first polymerized material and a second polymerized material that are selected from the group consisting of polyurethane, polypropylene, polystyrene, and polyethylene.

23. The method of claim 18 wherein the support structure comprises a fiber-reinforced material.

24. The method of claim 18 wherein the step of attaching is accomplished by a chemical attachment.

25. The method of claim 24 wherein the chemical attachment comprises a chemical adhesive.

26. The method of claim 18 wherein the step of attaching is accomplished by a physical attachment.

* * * * *